Nov. 12, 1929.  S. A. BOWMAN  1,735,596
PISTON PACKING
Filed Sept. 22, 1927
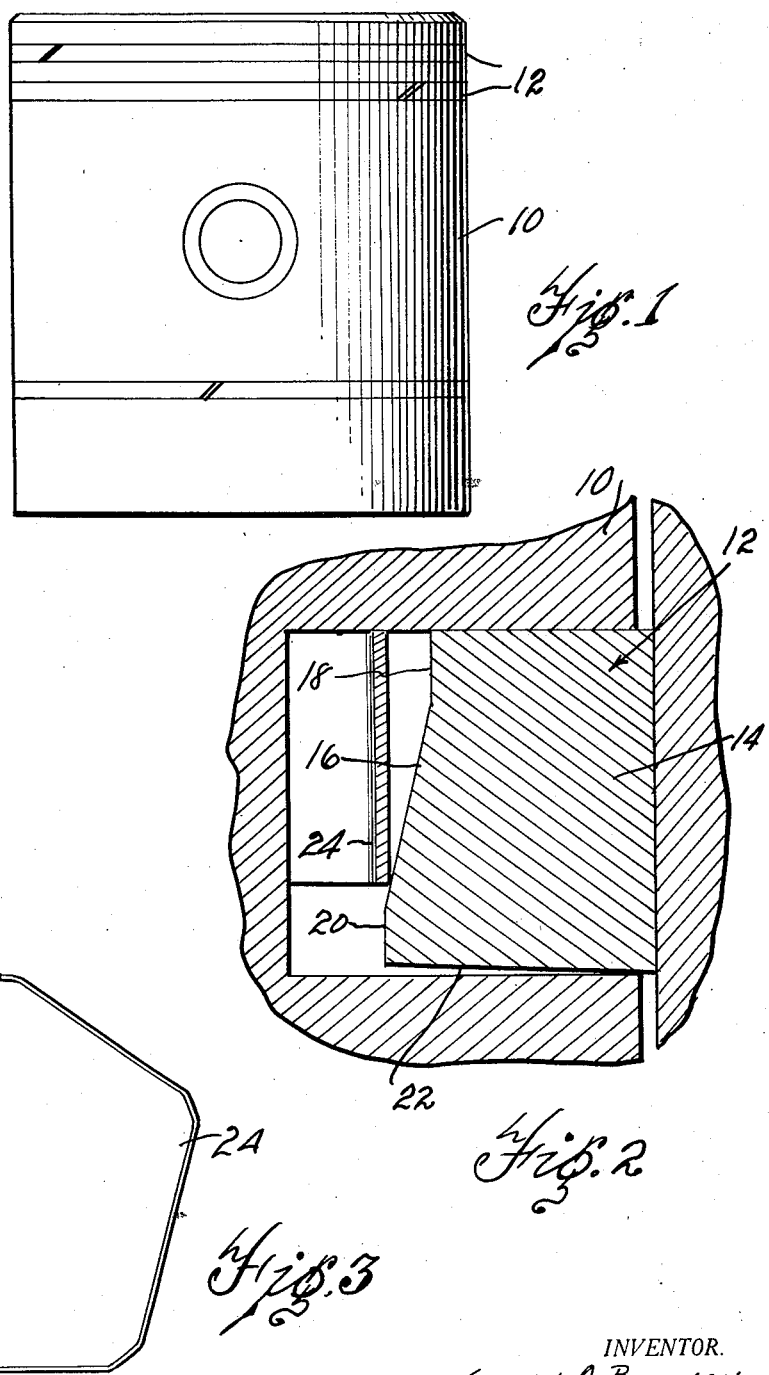
INVENTOR.
SIMEON A. BOWMAN
BY
Parker & Burton,
ATTORNEYS.

Patented Nov. 12, 1929

1,735,596

UNITED STATES PATENT OFFICE

SIMEON A. BOWMAN, OF HAMILTON, ONTARIO, CANADA, ASSIGNOR TO PANYARD MACHINE AND MANUFACTURING COMPANY, OF MUSKEGON, MICHIGAN, A CORPORATION OF MICHIGAN

PISTON PACKING

Application filed September 22, 1927. Serial No. 221,165.

My application relates to an improved piston packing.

The object is to provide a piston packing ring having an expansion spring, said ring and spring being so formed and arranged within the groove in the piston that the ring will be held outwardly against the cylinder wall within which the piston is mounted and downwardly against the lateral face of the groove in the piston to seal the joint formed with such groove and with the cylinder wall against leakage of compression or pumping of oil.

Another object is to provide such a construction wherein the packing ring which is held angularly outwardly against the cylinder wall and downwardly against the side wall of the groove is so supported by the spring as to be stabilized against wabble and held to find its normal seat in a worn cylinder or worn groove.

An additional meritorious feature is the provision of a packing particularly primarily intended for use in worn cylinders and worn pistons wherein the packing ring is so constructed as to be particularly adaptable for use in a piston ring groove which has worn to an oversize condition.

Other objects, advantages and meritorious features of my invention will more fully appear from the following description, appended claim and accompanying drawing wherein—

Fig. 1 is a side elevation of a piston provided with rings embodying my invention.

Fig. 2 is a fragmentary, cross-sectional view of enlarged dimension through a ring so mounted in a piston, and Fig. 3 is an elevation of a spring suitable for use in conjunction with my improved ring.

In the drawings let 10 indicate a piston provided with suitable packing ring grooves within which my improved piston rings 12 are mounted. I provide a packing ring 14 which is formed in cross-section as shown in Fig. 2. My improved ring has an axial dimension substantially equal to that of the groove in the piston and a flat outer face adapted to engage the cylinder wall. The ring is shaped as shown in Fig. 2 in cross-section, to wit, it is provided with an angular face 16 extending throughout its circumference and positioned between a pair of flattened faces 18 and 20 adjacent to the upper and lower lateral faces of the ring respectively. The lower lateral face 22 of the ring is formed on a bevel as is indicated in Fig. 2.

I provide a corrugated metal spring 24 which is disposed within the bottom of the groove in the piston and is of less width than the bottom of such groove so that it seats against the upper lateral face of the groove and at a plurality of points against the bottom of the groove and engages along its lower edge the angular face 16 of the ring. This spring is adapted to hold the ring outwardly against the cylinder wall and downwardly against the lower lateral face of the groove in the piston. The construction is such that when the packing ring is constricted against the tension of the spring, the spring is somewhat distorted and such packing ring bears strongly against the lower edge of the spring. Due to the packing ring seating in the bottom of the groove at a plurality of points, it exerts throughout its length a uniform pressure upon the ring and stabilizes the ring within the groove and against the cylinder wall. The ring possesses such a depth throughout its width that wear of the ring will not reduce its axial dimension and it will therefore have a long life.

It will be seen that the ring has a lower beveled face which will enable it to be received within a worn groove in a piston. Such grooves normally wear to a greater width adjacent to the cylinder wall and this beveling of the lower lateral face of the ring will serve to facilitate the positioning of the ring within such a groove.

What I claim is:

In combination with a cylinder provided with a working piston having a packing groove, packing in the groove comprising a packing ring having an outer face substantially the width of the groove in the piston, a pair of lateral faces the lower one of which is of substantially greater depth than the upper and slopes inwardly at an angle toward said upper face, a pair of inner faces substantially parallel to the outer face and positioned one adjacent to each lateral face, and an angular face connecting said inner faces, and a corrugated expansion spring of less width than the bottom of the groove disposed therein and bearing thereagainst at a plurality of points and having one edge engaging the upper lateral face of the groove and the opposite edge engaging the angular inner face of the ring.

In testimony whereof, I, SIMEON A. BOWMAN, sign this specification.

SIMEON A. BOWMAN.